(12) United States Patent
Chastain

(10) Patent No.: US 7,319,675 B1
(45) Date of Patent: Jan. 15, 2008

(54) SYSTEMS AND METHODS FOR CALCULATING CALL BLOCKING FOR ALTERNATE CALL ROUTING SCHEMES

(75) Inventor: W. Cooper Chastain, Atlanta, GA (US)

(73) Assignee: AT&T Mobility II LLC, Atlanta, GA (US)

( * ) Notice: Subject to any disclaimer, the term of this patent is extended or adjusted under 35 U.S.C. 154(b) by 927 days.

(21) Appl. No.: 10/655,233

(22) Filed: Sep. 4, 2003

Related U.S. Application Data

(60) Provisional application No. 60/488,106, filed on Jul. 17, 2003, provisional application No. 60/408,055, filed on Sep. 4, 2002.

(51) Int. Cl.
H04L 12/02 (2006.01)

(52) U.S. Cl. ...................... 370/252; 370/351

(58) Field of Classification Search ............... 370/252, 370/351
See application file for complete search history.

(56) References Cited

U.S. PATENT DOCUMENTS

| | | | | |
|---|---|---|---|---|
| 4,991,204 A | * | 2/1991 | Yamamoto et al. | 379/221.01 |
| 5,787,161 A | * | 7/1998 | Rayes et al. | 379/112.03 |
| 5,854,903 A | * | 12/1998 | Morrison et al. | 709/249 |
| 6,104,699 A | * | 8/2000 | Holender et al. | 370/235 |
| 6,385,172 B1 | * | 5/2002 | Kataria et al. | 370/238 |

OTHER PUBLICATIONS

Aalto et al., "New Algorithms for Calculating Blocking Probabilities in Multicast Networks", Helsinki Univ. of Tech; COST257/COM$^2$ seminar, Otaniemi; Feb. 13, 2001.

Bianco et al., "Analysis of Call Blocking Probability in TDM/WDM Networks With Transparency Constraint", IEEE Comm. Letters, vol. 4, No. 3; Mar. 2000.

Zeng et al., "Call Blocking Performance Study for PCS Networks Under More Realistic Mobility Assumptions", Kluwer Academic Publishers; Telecom Sys 19:2, 125-146, 2002.

* cited by examiner

*Primary Examiner*—Huy D. Vu
*Assistant Examiner*—Roberta Shand
(74) *Attorney, Agent, or Firm*—Coulter Henry Parks Knowlton LLC; Paul E. Knowlton, Esq.

(57) ABSTRACT

Systems and methods are provided wherein call-blocking probability of a telecommunications system is calculated based on consideration of over flow paths and alternate routes. Once the routes and overflow pathways are identified, the total number of call attempts and calls failed, due to congestion, is determined from statistical route data. Dividing the number of failed calls due to congestion by the number of attempted calls results in the blocking proportion for each route that is used by the methods disclosed herein to calculate the probability of blocking for that route.

4 Claims, 5 Drawing Sheets

Simple 3 route alternate route scheme

Simple alternate route scheme with IMT overflow ized or provided a system for calculating call blocking probability for a communications system that considers all possible alternate routes in the resulting blocking probability. Accordingly, it is an object of the present invention to provide a system and method for providing a call blocking probability-calculating method that accurately estimates the probability of call blocking in a network with alternate routing capability.

SYSTEMS AND METHODS FOR CALCULATING CALL BLOCKING FOR ALTERNATE CALL ROUTING SCHEMES

CROSS REFERENCE TO PROVISIONAL APPLICATION

This patent claims benefit of U.S. Provisional Application Nos. 60/408,055, filed Sep. 4, 2002, entitled "Blocking Calculation Process for Alternate Routing Schemes," and 60/488,106, filed Jul. 17, 2003, entitled "Arithmetic Routing Analysis Method." Each provisional patent application is incorporated herein by reference in its entirety.

BACKGROUND OF THE INVENTION

1. Field of Invention

This invention relates to new and improved systems and methods for providing calculations for determining blocking probability for alternate call routing in a telecommunications system.

2. Description of Related Art

Today's telecommunications systems have become large and easily reach most places in the world. Almost every home in the United States has its own telephone line, which is connected to a local switch in the nearest town or county, from there to a main switch in the nearest city, and from there to any other city in any other country in the world. These switches, or exchanges, as they are sometimes called, are interconnected through wires or lines, known as trunks. In this way, a person is able to dial another party in another country just was easily as if they were dialing someone on the same street.

For large and complicated networks to work properly, mathematics and computer simulation are used to understand and simulate the network. The aim is to design and control large networks to provide reliable communications systems and to use the network resources efficiently. The reliable and efficient operation of networks is of vital commercial importance to both users and telecommunications companies. Even modest percentage improvements in network efficiency can correspond to increases in quality for users and large revenue gains for telecommunications companies.

A large network may be affected by many factors, which are often hard to predict. There typically are busy and quiet periods throughout the day, sometimes expected and sometimes unexpected. For example, if a television program has a phone-in vote, there can be a sudden overload at one point or increment of time on the network. If a transmission line is lost due to a sudden or unexpected failure, the network can become overloaded if an adequate alternate call routing scheme was not in place.

Mathematicians have developed ways of calculating call routing schemes to route calls that can cope with these unpredictable events. These alternate call routing schemes typically operate by searching for spare capacity in a deterministic way in the network so as to route calls away from parts of the network that overloaded or temporarily off-line and into parts that can better handle the additional capacity or overflow.

Call blocking for call routing schemes is a key performance indicator (KPI) for the core of a telecommunications network. Unfortunately, the use of alternate routing schemes, complex IMT meshes and the inability to cause redirection due to distant trunk congestion makes the calculation of this key performance indicator extremely difficult. The purpose of this invention is to provide a new and useful method that uses probability theory to accurately estimate the probability of call blocking in a network with alternate routing capability.

SUMMARY OF THE INVENTION

As outlined above, conventional systems have not recognized or provided a system for calculating call blocking probability for a communications system that considers all possible alternate routes in the resulting blocking probability. Accordingly, it is an object of the present invention to provide a system and method for providing a call blocking probability-calculating method that accurately estimates the probability of call blocking in a network with alternate routing capability.

This invention provides method for calculating the probability of a call being blocked in a network having a plurality of routes by determining at least a first and second probability ($B_p$) of a call being blocked on the primary and secondary route, wherein a second incoming call enters the network at the secondary route and the second probability considers the impact of the second call. From this series of determination steps the first probability and the second probability are summed to provide an overall probability of blocking for the call over primary routes and alternate routes.

This invention further provides a method for determining the number of calls blocked in the network according to an expression in which the number of incoming calls at the primary route and the number of incoming calls at the secondary route are considered.

This invention also provides a method for calculating the probability of a call being blocked in a network having a plurality of routes forming a route set, wherein the number of legs in each route and the probability of blocking for each leg are determined and calculating the blocking in the network based on the determining steps.

This invention separately provides a method for rerouting calls from one route to another based on the probability of blocking for the available routes.

In various exemplary embodiments according to this invention, the probability of blocking for switch-to-switch, route-set, and MSC-PSTN egress are calculated.

These and other features and advantages of this invention are described in or apparent from the following detailed description of the apparatus/systems and method according to this invention.

BRIEF DESCRIPTION OF THE DRAWINGS

Various exemplary embodiments of this invention will be described in detail, wherein like reference numerals refer to identical or similar components or steps, with reference to the following figures, wherein.

DETAILED DESCRIPTION OF EXEMPLARY EMBODIMENTS

The exemplary embodiments of the systems and methods according to this invention provide a method for performing call blocking probability calculations in a telecommunications network.

A blocked call results when a call cannot be connected. The two most common reasons for blocked calls are: 1) all lines or trunks to or from the central office or exchange are in use or otherwise unavailable or 2) all paths to or from a PABX (Private Automatic Branch Exchange) or switch are in use or unavailable. Thus, based on these examples it may be necessary for a telecommunication network to calculate an alternate routing scheme to connect the call.

In these embodiments, alternate routing is defined as the process of redirecting a call over alternate routes when the primary route for that call is unavailable. That primary route, referred to as the P0 route, will overflow to one or more alternate routes comprised of secondary and tertiary high-usage trunk groups. These secondary and tertiary high-usage trunk groups are referred to as P1, P2, P3 and so on until all the routes in an alternate routing scheme are labeled in the order in which they are selected. A route is any path that connects at least two switching centers (nodes).

The expression for the probability of blocking can be found for an alternate routing scheme by first determining the routes that comprise the scheme and the overflow paths. Once the routes and overflow pathways are identified, the total number of call attempts and calls failed due to congestion can be determined from statistical route data. Dividing the number of failed calls due to congestion by the number of attempted calls results in the blocking proportion for each route that is used by the methods disclosed herein to calculate the probability of blocking for that route. The blocking expressions for switch-to-switch, route-set, and MSC-PSTN egress are described below.

Figure 1:
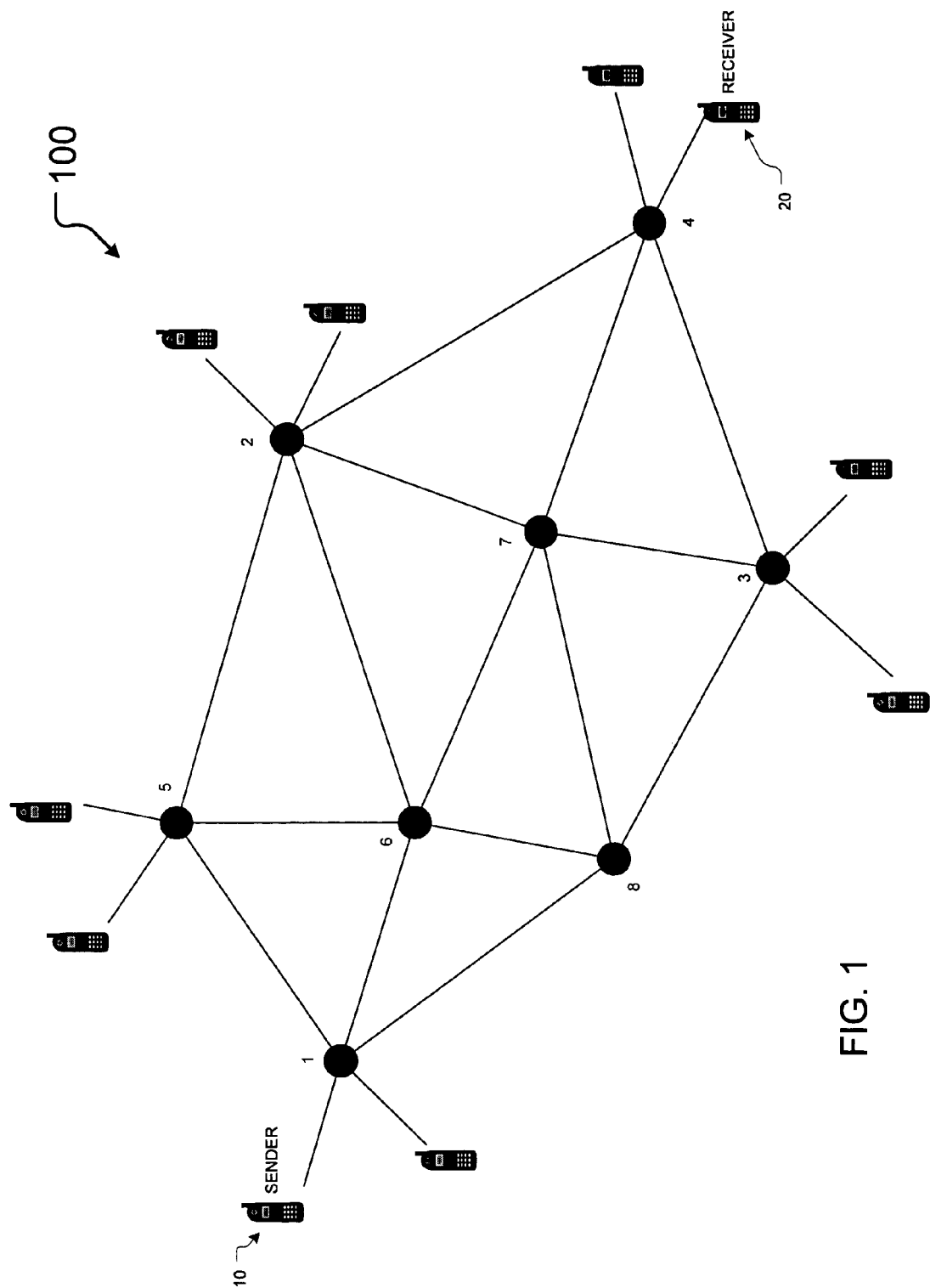
FIG. 1 illustrates an exemplary block diagram of a communications network having an alternate routing scheme according to this invention.

FIG. 1 illustrates a communications network 100 wherein routing nodes 1-8 interconnect a network of mobile stations and nodes. The nodes 1-8 represent switches, with the lines between the nodes representing trunks. Also illustrated are a sending (or calling) mobile station 10 and a receiving mobile station 20. In this illustration, the remaining mobile stations have not been labeled. It should be appreciated that any of the mobile stations shown in FIG. 1 can be sending or receiving mobile stations.

Prior to connecting a call from mobile station 10 to mobile station 20, a routing scheme is calculated to determine the optimal routing sequence using any number of nodes 1-8 to route call data from the sending mobile station 10 to the receiving mobile station 20. The primary routing scheme (P0), as discussed above, represents the best probability of connecting the call based on a blocking probability. The blocking probability is conventionally a percentage-based estimate of the successful connection of a call through each of the nodes 1-8. At entry node 1, a value is calculated based on the number of other incoming calls, the number of calls currently connected and the resources available at entry node 1. For example, entry node 1 may have an 80% probability of routing success. According, to the illustration in FIG. 1, from entry node 1 a call may be routable to any of secondary nodes 5, 6 or 8. Each of secondary nodes 2,3 and 5-8 has a similar probability of routing success associated with it. Depending on the percentages at each of these secondary nodes 2,3 and 5-8, it may be more optimal to next route the call to secondary node 7 for final completion to destination node 4, which is connected to the receiving mobile station 20.

Based on a combination of those percentages, a routing case is calculated for the call from mobile station 10 to mobile station 20. Included in the routing case a primary routing scheme (P0) is calculated. Also calculated are secondary and tertiary (P1, P2, P3, etc.) routing schemes for the call. Should for some reason the primary routing scheme (P0) fail the secondary and tertiary routing schemes are used as back up to connect the call.

Switch-to-Switch Calculations

In an alternate routing scheme (called a routing case in Ericsson terminology) where the routes are statically defined, the probability of unsuccessfully delivering a call from one node to another due to congestion is simply the product of the individual blocking probabilities for all nodes (entry, secondary and destination) in the selected route. The destination nodes are those nodes that connect the switch to the receiving mobile station 20, in FIG. 1 the destination node is shown as node 4.

Figure 2:
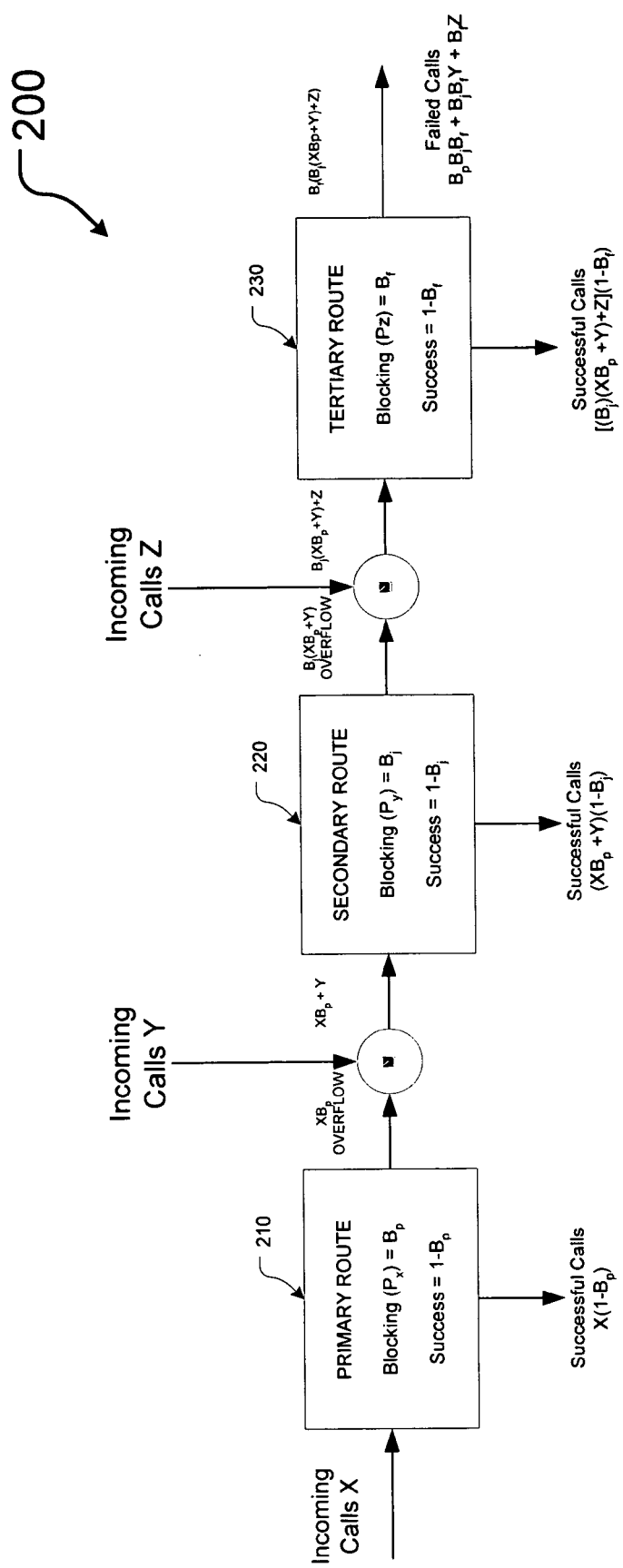
FIG. 2 illustrates an exemplary block diagram of an alternate routing case according to an embodiment of this invention.

An illustrative block diagram of a routing case is shown in FIG. 2, wherein X, Y and Z represent the offered calls and $B_p$, $B_j$, and $B_f$ representing the blocking proportion for the primary (P0), secondary (P1), and tertiary (P2) routing schemes, respectively.

FIG. 2 illustrates a routing case 200 for a telecommunications system according to the embodiments of this invention. The routing case 200 consists of three routing schemes that include a primary route (P0) 210, a secondary route 220 (P1) and a tertiary route 230 (P2). It should be appreciated that routes can be defined depending on the number of available routes. For illustrative purposes, only three routes have been defined, i.e., primary (P0), secondary (P1) and tertiary (P2).

As shown in FIG. 2 and in operation of the communications network, the call attempts to access the primary route 210 first (Incoming Calls X) then overflows to the secondary route 220 and finally to the tertiary route 230. The method disclosed by this example, perceives a blocked call due to route congestion only when the call fails to gain access to the tertiary route 230. In addition to incoming calls X, there are also incoming calls Y and Z which are offered to the secondary and tertiary routes 220 and 230, respectively as their first choice. The secondary route 220 is then the primary route for incoming calls Y and the tertiary route 220 is the primary route for incoming calls Z, leading to a system of call traffic comprised of three traffic inputs: X, Y, and Z.

The systems and methods according to this invention are used to derive the blocking probability by setting the number of call attempts equal to X and solving for the number of successful and failed calls with respect to X. The blocking proportion $B_p$ for the primary route 210 (P0) is $$P0 = B_p = \text{Blocks}_p / \text{Attempts}_p$$

wherein

Blocks$_p$=number of blocks of the primary route and

Attempts$_p$=total number of call attempts for the primary route

The number of overflowed calls from the primary route is equal to $XB_p$. The overflowed calls combine with the incoming calls (Incoming Calls Y) to the secondary route 220 to create the offered call traffic [$XB_p$+Y] to the secondary route 220. The number of calls that overflow from the secondary route 220 to the tertiary route 230 is $(XB_p+Y) B_j$. The overflowed calls from the secondary route 220 combine with the incoming calls to the tertiary route 230 (Incoming Calls Z) to create the offered call traffic $[Z+(XB_p+Y)B_j]$ to the tertiary route 230. The total number of customer perceived blocked calls for the entire communications network is $(Z+(XB_p+Y)B_j)B_f$.

To calculate the blocking probability with respect to X, the terms of the blocked calls formula X, Y and Z are grouped, the Y and Z are set to zero, and the number of blocked calls are divided by X. The result is $B_p B_j B_f$ and represents the probability of a customer perceived blocked call for all calls that attempted the primary route 210 first (Incoming Calls X). Use the same procedure to calculate the blocking probabilities for the Y and Z components by setting either X and Z or X and Y to zero. The results are $B_j B_f$ and $B_f$, respectively. This manual process forms the backbone for all calculations involving switch-to-switch blocking analysis, according to this invention.

In the exemplary embodiments of this invention, if the probability of blocking for the primary and secondary routes 210 and 230 is 1 (100% blocking), the blocking rate for the routing case 200 simplifies to $B_f$, which is the blocking proportion for the tertiary route 230. Substituting the tertiary route 230 blocking proportion for the routing case blocking rate represents an easy way to calculate the worst case blocking for a routing case. However, when the blocking proportions for the primary and secondary routes 210 and 230 are included in the calculation, the routing case 200 blocking rate will decrease as the blocking proportions for those routes drop below 1.

It should be appreciated that the number of components in the blocking probability analysis increases as the number of routes in the routing case increase. Since the blocking proportion must be less than or equal to 1.0 for any route, the routing case blocking probability will almost always decrease as additional routes are added to the routing case.

Route-Set Blocking

Figure 3:
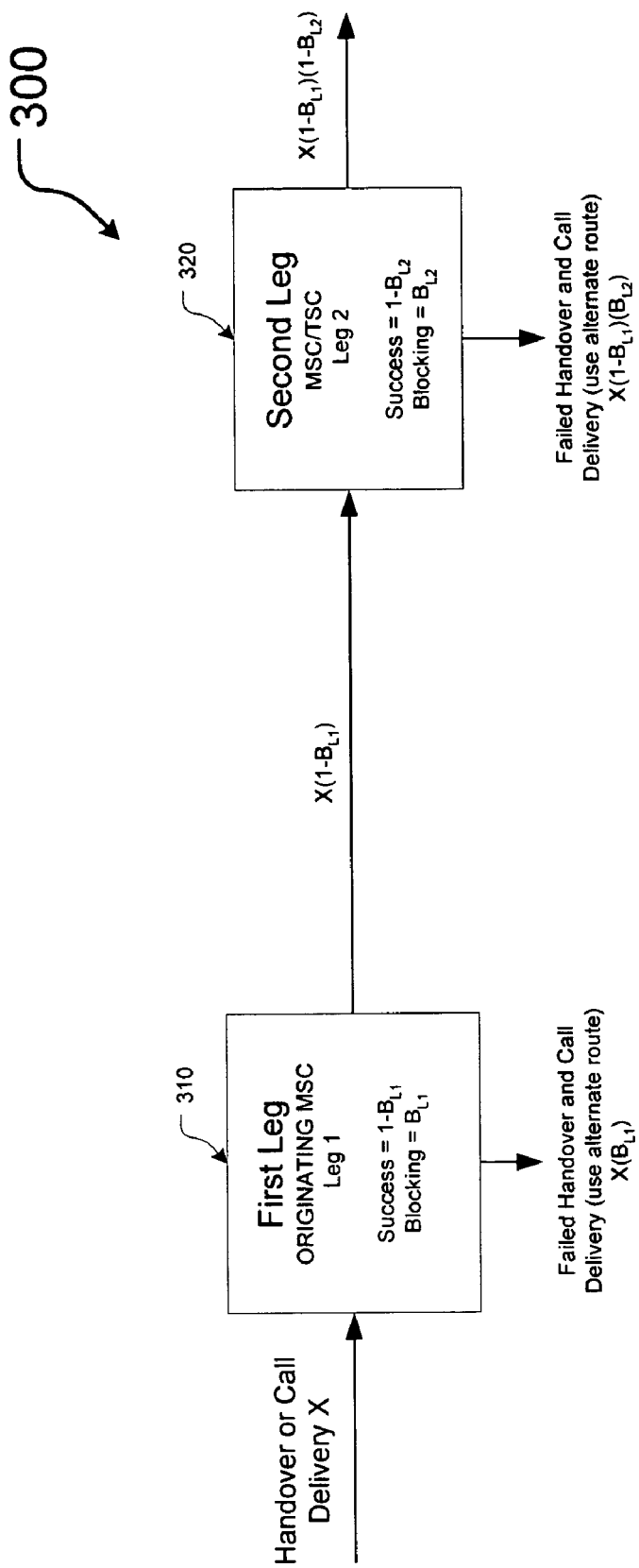
FIG. 3 illustrates an exemplary routing scheme having multiple legs according to this invention.

Referring to FIG. 3, in many cases, the call path from an entry node to the destination node is comprised of multiple legs, such as passing through one or more switches (secondary nodes) via IMT (inter-machine trunk) prior to reaching the destination node. In this case, the joint probability of the combination of the legs must be used to calculate the blocking probability for that routing scheme. For example, if a secondary route for a routing scheme is an IMT to another MSC (mobile switching center) followed by another secondary route to the destination node, then both secondary routes must be successful at the same time for the call to succeed.

The Arithmetic Routing Analysis Method is used once again to derive the blocking probability expression for routing schemes with multiple legs by setting the number of call attempts equal to X and solving for the number of successful and failed calls with respect to X. In FIG. 3, a routing scheme is shown comprising a first leg 310 and a second leg 320, the blocking proportion for the first leg 310 is given as $B_{L1}$; therefore, the number of attempts that successfully seize a channel on the route is $X(1-B_{L1})$ while the number of blocked calls is $X(B_{L1})$. Thus, $X(1-B_{L1})$ calls will arrive at the second switch for an attempt on the second leg 320 of the route set. The probability of failure for the second leg 320 is $X(1-B_{L1})(B_{L2})$. The total number of failed calls due to blocking for this route set is equal to the first leg 310 failures $[X(B_{L1})]$ plus the second leg 320 failures $[(1-B_{L1})(B_{L2})]$ and is expressed as $X(B_{L1})+X(1-B_{L1})(B_{L2})$.

The probability of blocking is found by dividing the number of blocked calls by the number of attempts. This is equal to $B_{L1}+(1-B_{L1})(B_{L2})$. Expanding the equation yields $B_{L1}+B_{L2}-B_{L1}B_{L2}$ which is equal to the joint probability of failure for the two (first and second) routes in the routing scheme.

If the first leg 310 ($P0_{L1}$) and second leg 320 ($P0_{L2}$) in the above example are engineered to 1.0% blocking each, then the overall blocking for the routing scheme would be 0.01+0.01−0.01*0.01 which is equal to 1.98%. The blocking probability for a routing scheme will almost always increase as additional routes are added to the routing scheme.

If the first leg 310 ($PO_{L1}$) is engineered to 0.0% GoS and the second route ($PO_{L2}$) engineered to 1.0% blocking, then the overall blocking for the routing scheme would be 0+0.01−0*0.01 which is equal to 1%. When the blocking proportion for an IMT route is 0, the IMT blocking proportion component can be eliminated from a routing scheme blocking calculation.

Entry Node to Destination Node Blocking

Since most wireless networks use a combination of IMTs and direct trunks for outbound PSTN connectivity, switch-to-switch and routing scheme blocking calculations are required to identify the expressions for MSC-to-PSTN egress (Entry Node to Destination Node) blocking. In addition, since most communication networks do not use route redirection for distant trunk congestion, ARAM must be performed manually as it was in FIG. 3.

The Laws of ARAM
1) For switch-to-switch calculations, the blocking proportion corresponding to the tertiary route is almost always greater than the actual customer perceived blocking.
2) For a route-set, the blocking probability will almost always increase as additional routes are added to the route-set.
3) For a route-set, when the blocking proportion for a first route is 0, the blocking proportion component can be eliminated from the routing scheme blocking calculation.

Using the methods of ARAM, in addition to customer perceived PSTN blocking, it is possible to calculate blocking for mobile-to-mobile calls via IMT, mobile-to-land calls that traverse a transit switch, mobile subscriber (MS) access to the MSC, and other types of traffic.

There are three steps for switch and market calculations using ARAM. These steps are:
1. Routing Case Identification (Route Discovery)
2. Data Collection
3. Post Processing
   a. Routing Case Calculations
   b. MSC Calculations
   c. Group Calculations Routing Case Identification (Route Discovery)

Before the customer perceived blocking can be calculated, two critical elements must be defined and identified: 1) the routes (including their nodes) that comprise the secondary and tertiary routing schemes and 2) each node's corresponding busy hours must be identified. Once these items have been defined and identified, using the methods discussed herein one can collect and post-process the data, yielding the blocking calculations for the MSC(s), communication market(s) and coverage region(s).

A necessary aspect of the customer perceived blocking is identification of the routes that comprise the alternate routing schemes because they form the basis of all calculations. This route discovery process should be performed for each MSC or component of the routing case.

For each routing case, all possible route choices within the routing scheme are identified and sequentially labeled as P0, P1, P2, etc. with P0 representing the primary route, P1 representing the secondary route, and so on until the final or last resort route is reached. If switch-to-PSTN egress calculations are required, all routing schemes including the individual routes belonging to the routing case are identified and sequentially labeled.

Described below are a series of examples that illustrate the methods used to identify routes within a routing scheme.

Example 1

Simple 3 Route Alternate Route Scheme
(Switch-to-Switch)

Figure 4:
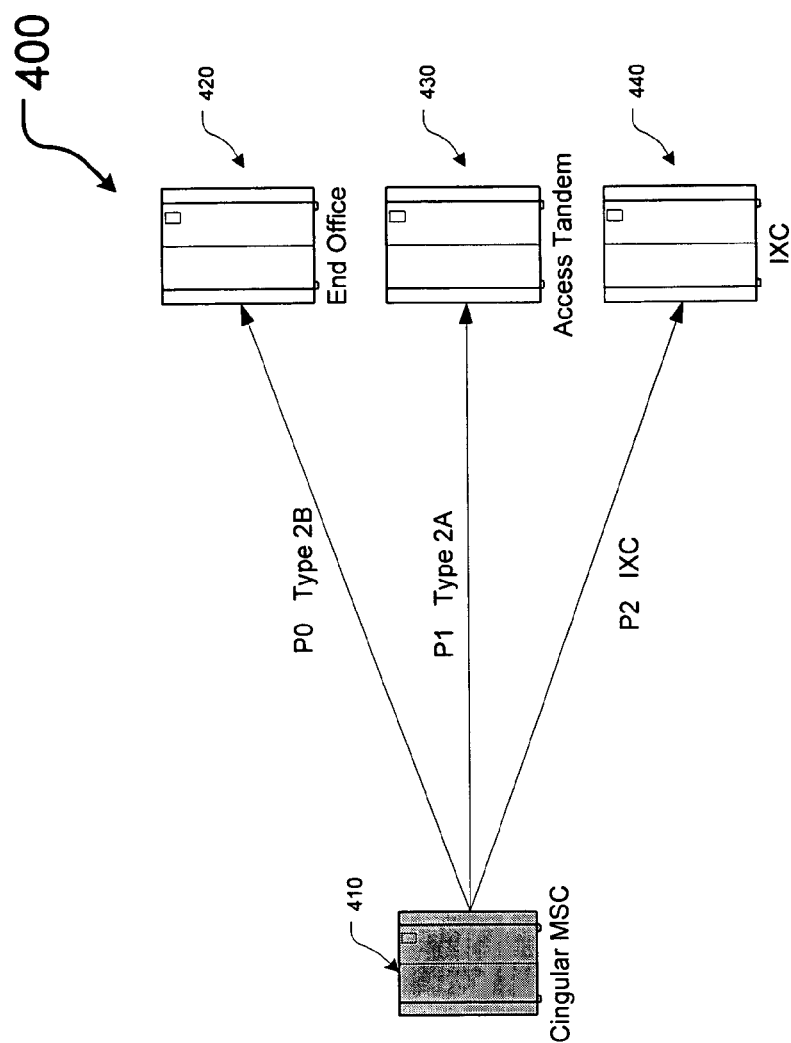
FIG. 4 illustrates an exemplary three route alternate routing scheme according to this invention.

The example shown in FIG. 4 is a simple case in which there are three routes in a routing case 400 used to connect a call from the sending mobile station 460 to the receiving mobile station 450. The primary route P0 is a type 2B route to an end office 420. The secondary route P1 is a type 2A route to an access tandem 430. The tertiary route P2 is an IXC route to the IXC carrier 440.

The routes should be itemized in the order in which they are selected including the selection number (i.e. P0, P1, etc.), the route name, and the route type.

In the example shown in FIG. 4, the blocking probability for the routing case 400 is:

=P0*P1*P2

Example 2

Simple Alternate Route Scheme with IMT
Overflow (Switch-to-Egress)

Figure 5:
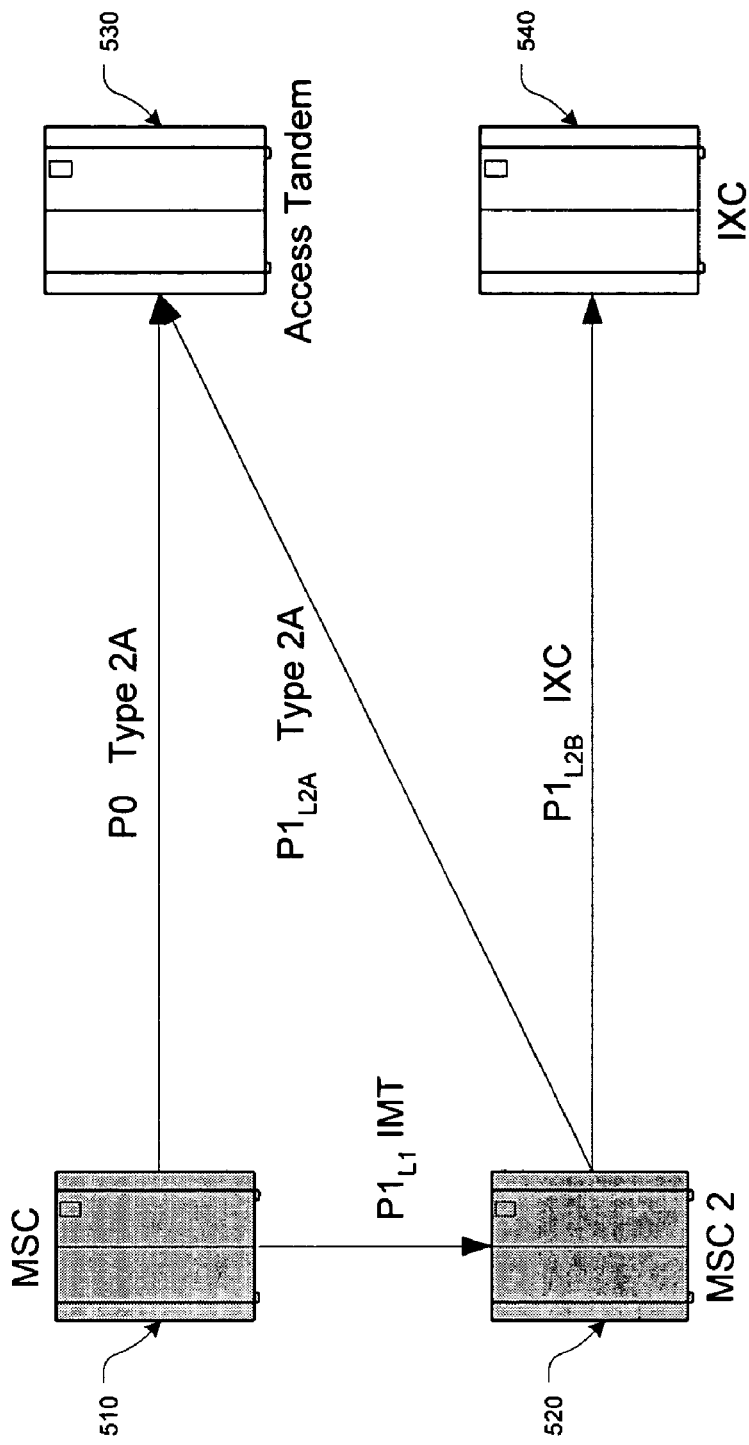
FIG. 5 illustrates an exemplary embodiment of a call routing scheme with IMT overflow according to this invention.

If one of the routes is an IMT route, then the possible choice of routes for the connecting MSC must be included in the route list since they contribute to the success and failure of the call. In the example shown in FIG. 5, the primary route P0 is a type 2A route to an access tandem 530. The secondary route P1, and in this case the final route for the MSC 510, is an IMT route to MSC 520. This IMT route is labeled $P1_{L1}$ since it is the first leg in the route set, or hop, for the P1 route. Once the call arrives via the $P1_{L1}$ IMT to MSC 520, there are two route choices. The first is a type 2A route to the same access tandem 530. This route is referred to as the $P1_{L2A}$ route since it is the first choice route for the second leg of the P1 route. If this route is congested, then the second choice route is an IXC route to the IXC 540, referred to as the $P1_{L2B}$ route since it is the second choice route for the second leg of the P1 route set.

In this exemplary embodiment, the blocking probability for the P1 route is calculated by taking the joint probability of the IMT route blocking and the overall blocking rate for the two alternate routes for MSC 520. Combining the blocking probability for the P1 route set with the blocking rate for the primary route P0 results in the overall blocking for this scheme. This can be expressed as:

$$= P0 * P1$$

$$= P0 * [P1_{L1} + P1_{L2} - (P1_{L1} * P2_{L2})]$$

$$= P0 * [P1_{L1} + (P1_{L2A} * P1_{L2B}) - (P1_{L1} * P1_{L2A} * P1_{L2B})]$$

If the blocking rate for the $P1_{L1}$ IMT is 0.0%, then the equation simplifies to

=P0*P1_{L2A}*P1_{L2B}

If the blocking rate for the $P1_{L1}$ IMT is 100.0%, then the equation simplifies to

=P0

Data Collection

One exemplary method that can be used to calculate the blocking probability for a routing scheme using routing cases is to use the routing case blocking probabilities that correspond to the routing case busy hours in the calculation. This means that for each routing case, the blocking probabilities could have been measured at different times. The result is the average individual routing case busy hour (IRCBH) blocking for the routing schemes which provide the average worst case blocking for those schemes. This sampling method is equivalent to an ICBH (individual cell busy hour) RF blocking calculation.

A second exemplary method that can be used to measure the alternate route blocking for a routing scheme is to sum the routing case attempts on an hourly basis and then set the system busy hour to the time in which the largest number of attempts occurred. This provides the individual MSC system busy hour (IMSBH) and can be used to calculate the blocking probability during the system (switch) busy hour. If the sum of the routing case attempts is not available, another indicator such as the entry node busy hour can be used to identify the IMSBH.

Once the routing schemes have been identified and the routes that comprise those schemes listed are in order of selection, one must identify the top monthly busy hours for each routing case or for each MSC in the area of question, depending on the type of calculation performed (average IRCBH or average IMSBH). The number of busy hours used may vary, but the recommendation is a value between 10 and 15 per month used consistently for each switch. Once the busy hours have been identified, the route data corresponding to these busy hours is collected and averaged. The route data should include the following:

- the number of attempts
- the number of blocks
- the number of defined circuits for each route Once the route data has been collected and averaged, the data can be post processed and used to determine the routing case blocking probabilities, switch blocking probabilities, market blocking probabilities, and so forth.

Post Processing

There are three types of calculations that can be made in the post processing process, depending on the type of information desired.

1) Routing Case Blocking
2) MSC Blocking
3) Group Blocking

To calculate the routing case blocking probabilities, the individual route blocking proportions are used to calculate either the switch-to-switch (node-to-node) or switch-to-PSTN egress (secondary node-to-destination node) routing case blocking probabilities. For reference, the individual route blocking proportion should be found with the following equation:

$P_x = B_x = \text{Blocks}_x / \text{Attempts}_x$

The routing case blocking probability expressions must be defined in order to calculate the routing case blocking probability. If they have not, please refer to the Overview and Process Definition section of this document for a description on how to do this.

To calculate the overall customer perceived PSTN blocking for a MSC (regardless of the blocking calculation type), perform a weighted average of all the routing case blocking probabilities using the average number of attempts for each routing case as the weight. The closed form expression for the MSC blocking rate (i.e. blocking of routing cases within a switch) is:

$$\frac{\sum_{rc=1}^{L}(P_{rc}*ATT_{rc})}{\sum_{rc=1}^{L}ATT_{rc}}$$

wherein
L=number of routing cases for switch
$P_{rc}$=blocking probability for routing case rc
$ATT_{rc}$=avg # of attempts for routing case rc The equation shown above can provide both the individual routing case busy hour (IRCBH) blocking and the individual MSC system busy hour (IMSBH) blocking. Either the average IRCBH blocking or the IMSBH blocking can represent the PSTN blocking rate for the MSC. The average IRCBH blocking should always be equal to or greater than the IMSBH blocking.

To calculate the overall blocking for a group of switches, such as a market and/or region containing a group of MSCs, the equation can be modified to perform a weighted average of either the average IRCBH or IMSBH for each MSC using the sum of the average number of routing case attempts for each MSC as the weight (or some other traffic dependent weight), as shown in the following equation. The resulting calculation will provide either the average switch-to-switch or average switch-to-PSTN egress blocking probability.

$$\frac{\sum_{msc=1}^{K}(P_{msc}*ATT_{msc})}{\sum_{msc=1}^{K}ATT_{msc}}$$

wherein
K=number of MSCs for the market or region
$P_{msc}$=blocking probability for switch MSC
$ATT_{msc}$=total avg. number attempts for switch MSC While this invention has been described in conjunction with the exemplary embodiments outlined above, it is evident that many alternatives, modifications and variations will be apparent to those skilled in the art. Accordingly, the exemplary embodiments of the invention, as set forth above are intended to be illustrative, not limiting. Various changes may be made without departing from the spirit and the scope of the invention.

The invention claimed is:

1. A method for calculating the probability of a call being blocked in a network having a plurality of routes, comprising:
measuring a first probability ($B_p$) of a call being blocked on the primary route;
measuring a second probability ($B_d$) of a call being blocked at the secondary route, wherein a second incoming call enters the network at the secondary route and the second probability considers the impact of the second call;
summing the first probability and the second probability; and
determining the number of calls blocked in the network according to the expression $B_d(XB_p+Y)$ in which X represents the number of incoming calls at the primary route and Y represents the number of incoming calls at the secondary route.

2. A method for calculating the probability of a call being blocked in a network having a plurality of routes forming a route set, comprising:
determining the number of legs in each route;
determining the blocking probability for each leg; and
calculating the blocking in the network according to the equation:

$$1-\prod_{z=1}^{M}(1-P_z),$$

wherein M is the number of legs for the route and $P_z$ is the blocking probability for leg z.

3. The method of claim 2 wherein the network has the ability to reroute calls from one route to another and wherein the calculating step is performed according to the equation:

$$\prod_{y=1}^{N}\left[1-\prod_{z=1}^{M}(1-P_{yz})\right],$$

wherein N is the number of routes in routing case, M is the number of legs for each route y in routing case and $P_{yz}$ blocking probability for route y on leg z.

4. A method for calculating the probability of a call being blocked in a network having a plurality of routes forming a route set wherein the network is capable of rerouting network traffic based on the probability of blocking, comprising:
measuring a first probability ($B_p$) of a call being blocked on the primary route;
measuring additional probabilities of a call being blocked on each of the remainder of the routes in the route set, wherein additional incoming calls may enter the network on the remainder of the routes and the additional probabilities considers the impact of the additional incoming calls; and
calculating the probability of the route set blocking according to the equation:

$$\prod_{y=1}^{N}\left[1-\prod_{z=1}^{M}(1-P_{yz})\right],$$

wherein N is the number of routes in routing case, M is the number of legs for each route y in routing case and $P_{yz}$ blocking probability for route y on leg z.

* * * * *